United States Patent [19]

Chinn

[11] Patent Number: 5,056,885
[45] Date of Patent: Oct. 15, 1991

[54] FIBER OPTIC SWITCH

[75] Inventor: Stephen R. Chinn, Baldwinsville, N.Y.

[73] Assignee: General Electric Company, Syracuse, N.Y.

[21] Appl. No.: 521,460

[22] Filed: May 10, 1990

[51] Int. Cl.$^5$ ............................ G02B 6/26; G01B 9/02
[52] U.S. Cl. .................................. 350/96.13; 385/16; 356/350
[58] Field of Search ............... 350/96.15, 96.13, 96.29; 356/350

[56] References Cited

U.S. PATENT DOCUMENTS 4,070,094 1/1978 Martin ............................. 350/96.14

OTHER PUBLICATIONS

"Optical Fiber Faraday Rotation Current Sensor with Closed-Loop Operations", A. Kersey & A. Dandridge, Elect. Let., vol. 21, No. 11, May 29, 1985, pp. 464–466.

Primary Examiner—John D. Lee
Assistant Examiner—Stephen W. Barns
Attorney, Agent, or Firm—Richard V. Lang; Paul Checkovich; Fred Jacob

[57] ABSTRACT

The invention relates to an electrically operated fiber optical switch for circularly polarized light. The switch comprises an input 3-dB fiber optic coupler, a Faraday effect fiber optic phase rotator and an output 3-dB fiber optic coupler, all three providing dual fiber optic paths. The input 3-dB coupler divides the light waves between two oppositely wound optical fibers in the Faraday effect phase rotator. The magnetic fields in the phase rotator are adjusted to produce the desired (e.g. $\pm\pi/2$ radians) relative phase delays between the divided light waves, the sign of the relative phase being dependent on current direction. When the light waves are recombined in the output 3-dB couplers, cancellation will occur in one or the other output fiber as a function of the direction of the magnetic field. The arrangement provides rapid switch operation by reversing the current direction in a magnetic field producing winding. The optical switching occurs in an all fiber system, avoiding the losses present in transitions to non-fiber wave transmission paths.

6 Claims, 2 Drawing Sheets

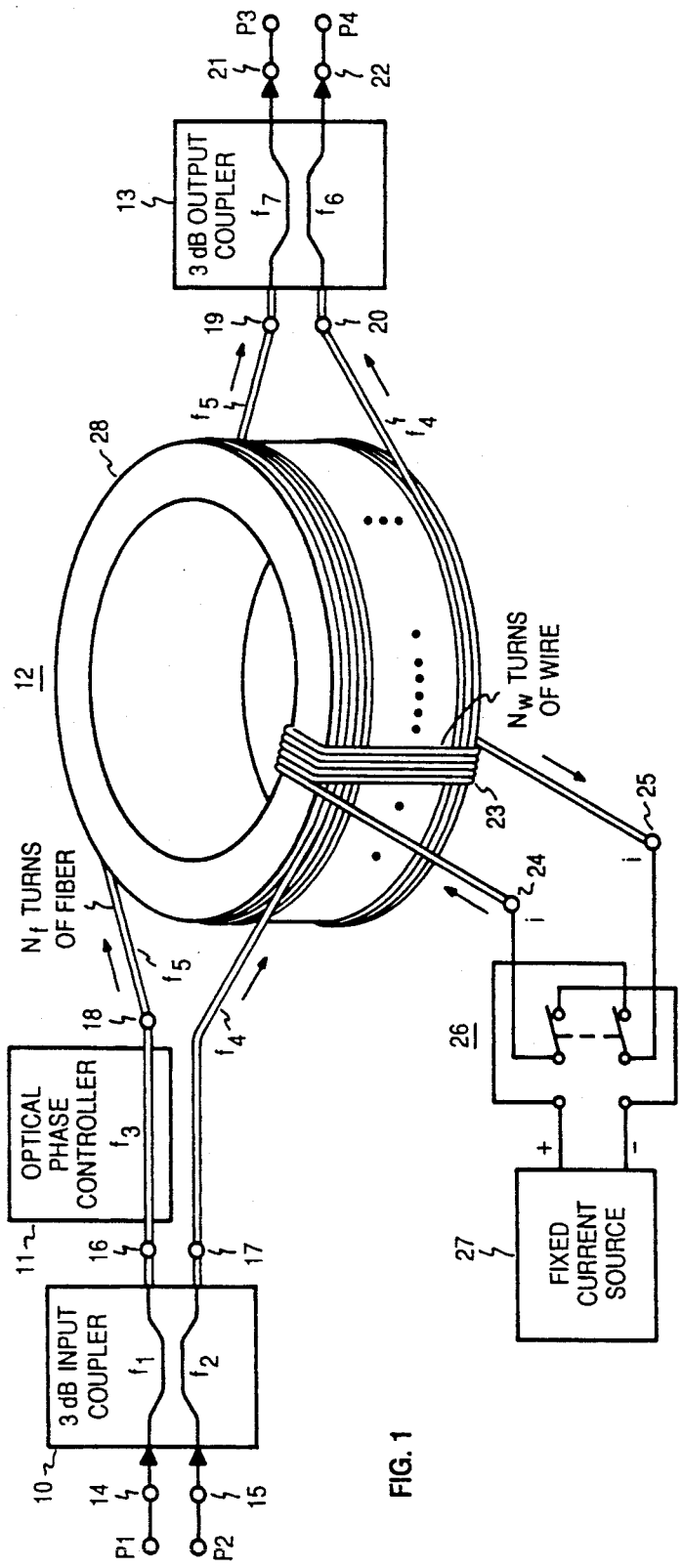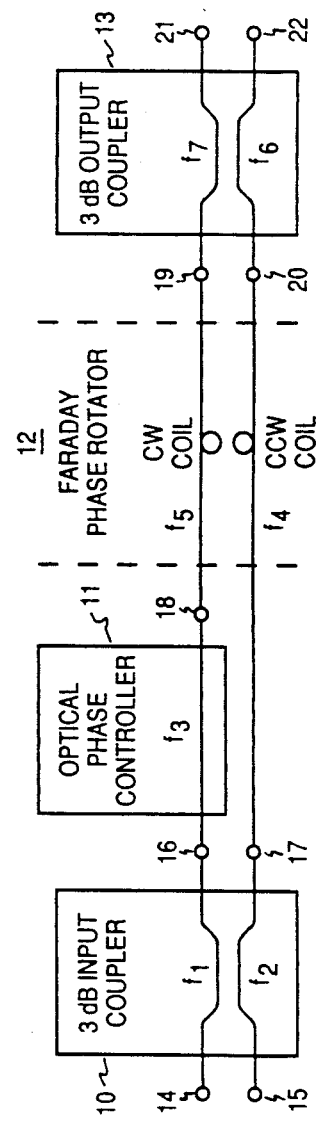
FIG. 1
FIG. 2

FIBER OPTIC SWITCH

BACKGROUND OF THE INVENTION

1. Field of The Invention

The invention relates to electrically driven optical switches employing the interferometric principle and more particularly to a low loss, electrically driven optical switch for circularly polarized light utilizing Faraday effect magneto-optic phase shifting.

2. Description of the Prior Art

Optical switches have been proposed using a variety of integrated optical waveguide structures. The balanced bridge, Mach-Zehnder modulator is one. In the known Mach-Zehnder modulator, which has two input ports and two output ports, an input light wave of usually plane polarized light is split into two equal components in an input 3-dB coupler. The two components then propagate over two arms of an interferometer and are subjected to independent phase shifts before being combined in an output 3-dB coupler. If no relative phase shift is present, all of the light "crosses over" to the diagonal output port. If a relative phase shift of $\pi$ radians is introduced between the two arms, the light goes "straight through" the input waveguides to the direct output port. If both relative phase states are achievable, the modulator may be used as a switch.

In the Mach-Zehnder interferometer just described, the relative phase shift between the two arms of the interferometer is brought about by means of an electrical field acting on an optical path in a material whose optical indices of refraction are altered by the electric field. The electric field is then used to adjust the phase delay in one path relative to the other.

In the conventional Mach-Zehnder design, the light is supplied to the interferometer in fibers from which the light is coupled to light conducting waveguide paths diffused into a lithium niobate crystal ($LiNbO_3$, or more popularly "LNO") which has the necessary electro optical properties. Such a configuration is discussed in an article entitled "Waveguide Electro-optic Modulators" by Rod C. Alferness appearing in the IEEE Transaction on Microwave Theory and Technique, Vol. MTT30, August 1982, page 1129-1131.

The planar waveguide sections formed in a LNO switch of the Mach-Zehnder design have an optical mode size and shape differing from that in a fiber. The differences between a fiber and an integrated waveguide result in a substantial amount of fiber to waveguide coupling loss. Conventionally the losses are from one to two dB at the input connections and an equal amount at the output connections. When switches are connected in tandem, each tandem connection increases the optical loss. The optical loss in dB is doubled to give the equivalent electrical loss, producing an undesirably high total loss for each tandem connection. More than one tandem connections are therefore generally impractical. Removal of the coupling loss in an optical switch would accordingly be highly desirable.

The interferometric concept has also been used for many kinds of fiber sensors. These devices detect changes in pressure, strain, or temperature. Those that are sensitive to electric or magnetic fields generally have an intermediate field-to-strain transducer. The intermediate mechanical or thermal inputs for such sensors make for a slow response, which is undesirable for a switch. Thus for optical switching, where switching speed is important, a direct response to electro-magnetic field change is preferable. Since the amorphous silica fibers commonly available for light transmission have a fixed, average inversion symmetry, such that low frequency and dc electric fields have no effect, their use for electro-optical switching is ruled out.

The alternative to electro-optical sensing is magneto optical sensing, using Faraday effect phase shifting. This effect has been used to sense currents in high voltage power line without introducing electrical paths between the high voltage line and near-ground potentials used for the sensing equipment. In a known arrangement described in the Rashleigh et al article (discussed hereinafter), the current is sensed by detecting changes in linear polarization through a single-fiber loop around a conductor. The sensors herein described usually sense small, analog phase changes rather than the larger $\pm 90°$ phase changes required for optical switching.

SUMMARY OF THE INVENTION

Accordingly, it is an object of the invention to provide a low loss optical switch for circularly polarized light using the interferometric principle.

It is another object of the invention to provide an optical switch for circularly polarized light using the interferometric principle in which low losses are achieved by use of an all fiber design.

It is still another object of the invention to provide a fiber optic switch for circularly polarized light using magneto-optically induced phase shifts in an interferometer configuration.

These and other objects of the invention are achieved in a novel fiber optic switch comprising an input 3-dB fiber optic coupler to which circularly polarized light waves are supplied, a Faraday effect, fiber optic phase shifter, and an output 3-dB fiber optic coupler from which a switched circularly polarized light output is derived.

Circularly polarized light enters the first 3-dB coupler in one of two input fibers. Preferably the coupler is of an evanescent field fiber optic design, which is insensitive to the polarization of the light waves. The split light waves are then supplied to the Faraday effect fiber optic phase rotator where the waves propagate in opposite senses through two multi-turn coils of fiber wound on a common spool. A toroidal solenoid wound around these fiber coils produces a magnetic field whose vector is parallel or anti-parallel to the direction of wave propagation in the fiber.

The Faraday effect produced by the magnetic field causes a differential phase shift between the circularly polarized, oppositely directed light waves in the two fibers. The amount of phase shift is dependent upon the Verdet coefficient, the magnetic flux density and the length of the fiber. Thus, with the light traveling in opposite directions in the two fibers, light rays in the respective fibers will experience oppositely directed fields and will experience generally opposite phase shifts. Light in the two fibers exiting from the Faraday effect phase rotator are then recombined in a 3-dB output coupler.

When the relative phase between the two circularly polarized beams, is $+\pi/2$ radians at the input to the coupler, the light will exit from one of the output fibers. When the relative phase is $-\pi/2$ radians, the light will exit from the other fiber.

By reversing the current and thereby the magnetic fields, the relative phase shifts may be reversed, to achieve electrical switching of the circularly polarized light waves from one output fiber to the other.

BRIEF DESCRIPTION OF THE DRAWINGS

The inventive and distinctive features of the invention are set forth in the appended claims. The invention itself, however, together with further objects and advantages thereof may best be understood by reference to the following description and drawings, in which:

FIG. 1 is an illustration of a novel 2×2 fiber optic switch for circularly polarized light and the principal optical and electrical connections thereto;

FIG. 2 is a simplified representation of the principal fiber optic paths between the input and output ports of the fiber optic switch of the FIG. 1 embodiment.

DESCRIPTION OF THE PREFERRED EMBODIMENT

Figure 3A:
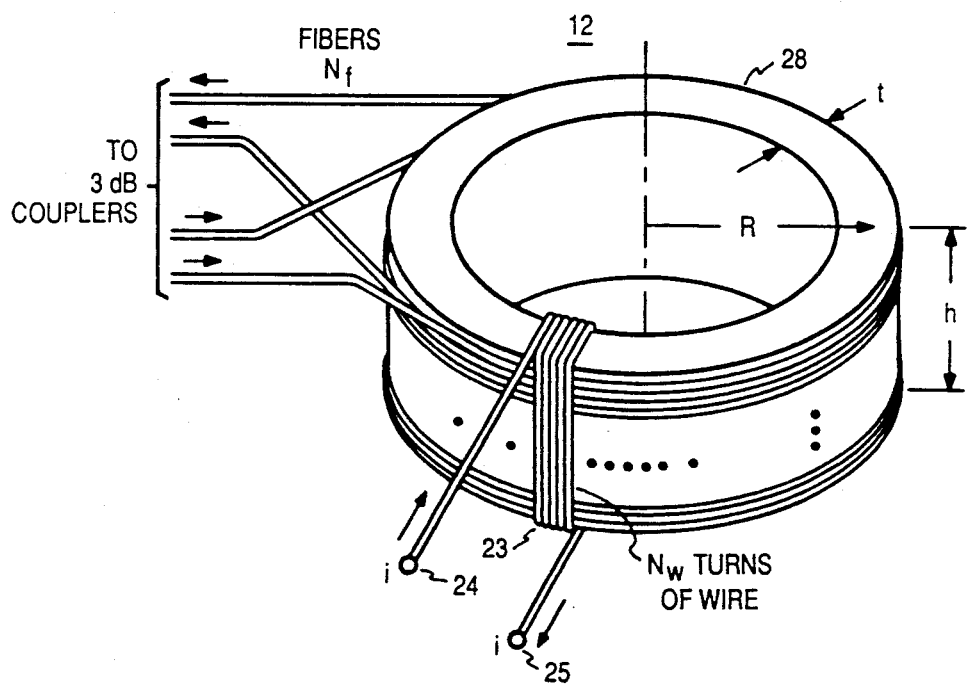
FIGS. 3A and 3B illustrate the electrically controlled Faraday effect phase rotator which is a part of the FIG. 1 embodiment.

A novel bidirectional 2×2 fiber optic switch for circularly polarized light is shown in FIG. 1. The optical paths in the switch may be entirely provided by optical fibers. The switch is a four-port device. In one direction of operation, two associated ports P1 and P2 become input ports at which external circularly polarized light may be supplied to optical fibers within the switch, and two associated ports P3 and P4 become output ports at which internal circularly polarized light may be provided from optical fibers within the switch. While not limited thereto, the external connections made to these ports may also be by means of optical fibers.

The term "2×2" implies that the device has interchangeable input ports, interchangeable output ports, and is bidirectional. In other words, either or both of the associated ports P1 and P2 may be used for input or output functions and the other associated ports P3, P4 may be used for output or input functions, respectively.

The invention is applicable to the switching of circularly polarized light. In other words, if circularly polarized light is supplied to the port P1, then—depending upon the state of the switch—an output also of circularly polarized light, will appear at either port P3 or P4. Similarly, if circularly polarized light is supplied to port P2, depending upon the state of the optical switch, the output will appear at either port P3 or P4. The reciprocal statements are also true: if circularly polarized light is supplied to P3 then, depending upon the state of the switch, a circularly polarized light output will appear at port P1 or P2 and similarly if circularly polarized light is supplied to the port P4, depending on the state of the switch, circularly polarized light will appear at the port P1 or P2.

The electrical equivalent of the fiber optic switch may be characterized as a single pole double throw switch where either one of the four ports may serve as the input and the non-associated pair of ports as the potential terminals to which the poles may make contact. The switch has two states, one state in which port P1 is coupled to port P3, and port P2 is coupled to port P4—"a straight through" state; and one state in which port P1 is coupled to port P4 and port P2 is coupled to port P3—"a cross-over" state, thus providing a double pole double throw function.

Since the fiber optic switch is highly linear, the simultaneous application of circularly polarized light to both ports P1 and P2, will not affect linear operation, and the properties of the switch for joint optical signals amount to a simple superposition of the properties for individual signals.

As will be explained, the switching properties depend upon a relative 0 or $\pi$ change in phase of circular polarization in the two fiber paths and their interference to produce a zero or a unitary resultant. FIG. 1 illustrates a practical embodiment.

As seen in FIG. 1, the 2×2 optical fiber optic switch consists of a first 3-dB fiber optic coupler 10, one optical phase controller 11, a Faraday effect fiber optic phase rotator 12, and a second 3-dB fiber optic coupler 13 The fiber devices 10, 12, 13 each include double fiber paths while the device 11 includes a single fiber path. The fiber devices are then serially connected so that two continuous fiber paths are formed between the input ports P1 and P2 and the output ports P3 and P4 respectively. In particular, a first continuous fiber path from P1 to P3 entails passage through elements 10, 11, 12, and 13, while a second continuous fiber path from P2 to P4 entails passage through elements 10, 12 and 13. As will be seen, if circularly polarized light is applied to at least one of the ports P1 and P2 of the switch then circularly polarized light may be derived from at least one of the output ports P3 and P4, dependent upon the state of the switch. Assuming a single input as an example, a single output will appear at one or the other output ports as a function of the state of the switch. Switch operation for the single input example will now be described with reference to the optical switch depicted in FIGS. 1 and 2.

Accordingly, circularly polarized light is applied to the input port P1 of the switch and supplied via a fiber optic connection to an optical input 14 of the first 3-dB fiber optic coupler 10. In the coupler 10, the optical power, supplied to the port P1 is equally divided and appears in equal quantities but with a $\pi/2$ relative phase between quantities at the output 16 and 17.

The 3-dB fiber optic coupler 10 may take the form of an evanescent field device in which a single fiber f1 runs between the input 14 and output 16 and a single fiber f2 runs between the input 15 and output 17, the two fibers being aligned in proximity in a light exchanging manner at a position between the inputs and outputs.

Light exchange in an evanescent wave coupler requires the removal or fusion of a portion of the cladding of both optical fibers f1 and f2 so that their cores may be brought into close proximity to achieve optical coupling. While the principal light energy in an optical fiber is confined to the core, a peripheral portion—the evanescent wave—propagates within the cladding with diminishing intensity at greater distance from the core. In one design, the correct amount of cladding is removed and the correct amount of proximity between cores is achieved to provide a 3-dB split in the optical power between the two fibers. In the process of division, light signals at the two coupler outputs 16 and 17 now differ by $\pi/2$ relative phase.

The evanescent field fiber optic couplers may take any of several commercially available forms. A suitable 3-dB coupler is that produced by the Canadian Instrumentation and Research Limited, Burlington, Ontario, Canada, under the product name "Evanescent Wave Couplers".

The light transmitted in the fiber f1 appearing at output 16 of the first 3-dB coupler 10 is then coupled via fibers f3 and f5 to the input 19, and light transmitted in the fiber f2 appearing at the output 17 of coupler 10 is then coupled via fiber f4 to the input 20 of the second 3-dB coupler 13. The optical phase controller constituting fiber path f3 provides a means of independently adjusting the optical phase through that path over a minimum range of from 0 to $2\pi$. This phase bias adjustment may be of relatively slow response (e.g. piezoelectric, thermal, magnetostrictive) and is meant to compensate for phase imbalance between paths f4 and f5.

In one state of the switch, the current through the electrical solenoid passes 23 in one direction and is adjusted to produce a Faraday-effect-induced relative phase shift of $+\pi/2$ between paths f5 and f4. The offset phase bias from phase controller 11 is set such that the combined effects of the offset phase bias and Faraday-effect-induced phase shift produce no added differential phase shift between the 3-dB couplers 10 and 13. In the other state of the switch, an additional relative phase shift of $\pi$ is provided by control of the magnetically induced Faraday effect. The inputs 19 and 20 to the second 3-dB coupler lead to fibers f7 and f6, respectively, traversing the second coupler leading to coupler outputs 21, and 22, respectively. The coupler outputs 21 and 22 then lead to the output ports P3 and P4 of the optical switch.

Assuming that the circularly polarized light is supplied via port P1 to input 14 alone, then the phase of the light derived from fiber f2 at output 17 will have a phase of $-\pi/2$ relative to the phase of the light derived from fiber f1 at output 16. (Had the energy been supplied via port P2 to input 15 alone, then the light derived from fiber f1 at the output 16 would have a phase of $-\pi/2$ relative to the light derived from fiber f2 at output 17.)

In the crossing state of the switch, wherein light passes from P1 to P4 or from P2 to P3, the light at the input 20 to the fiber f6 of the second 3-dB coupler 13 will have a phase of $-\pi/2$ relative to the output supplied to the input 19 to the fiber f7 of the second 3-dB coupler. Due to the reciprocal nature of the coupler 13, which may be identical to the input coupler 10, the presence of the two light signals in phase quadrature at inputs 19 and 20 to fibers f7 and f6, results in all the energy being supplied to the fiber f6 supplying the coupler output 22. As a result, the light coupled to input port P1 is supplied to the output port P4 of the optical switch. Had the energy been initially supplied via port P2 to the input 15 (assuming the switch to be in the crossing state), then all of the light would have been supplied to the fiber f7 supplying the coupler output 21. As a result, the light coupled to input port P2 is supplied to the output port P3 of the optical switch.

When the Faraday phase rotator 12 is suitably designed and energized in accordance with the invention, either the crossing state or the straight through state may be obtained by electrical switching. In particular, an input coupled to port P1 may be electrically switched to either output port P3 or P4. Similarly, an input coupled to port P2 may be electrically switched to either output port P3 or P4.

The novel Faraday phase rotator 12, which is inserted into the double fiber optic paths between couplers 10 and 13, consists of two coaxial coils of single mode optic fibers f5 and f4 respectively, wound upon a common hollow spool 28, a toroidal electrical winding 23 encircling the coils and the spool, and a two state current source, the selection of which causes a change in the state of the switch. The Faraday phase rotator is designed to utilize the Faraday effect by which beams of circularly polarized light oppositely directed to a magnetic field experience differential phase shifts.

In the novel phase rotator, the Faraday affect is exploited by winding the two fiber coils, whose windings are colinear with the magnetic field, in opposite senses, and energizing the windings producing the magnetic field. With the optical phase controller 11 present and optimally adjusted, equal but oppositely directed currents produce a fully on or fully off switching state. The single mode fiber f5, which is serially connected with fibers f1, F3 and f7, is wound in a clockwise sense about the spool 14. The optical fiber f4, which is coupled between the fibers f2 and f6 of the couplers 10 and 13 respectively, is wound in a counter-clockwise sense about the spool 14.

In the preferred embodiment of the rotator, both fibers f4 and f5 would be wound simultaneously and in proximity to each other about the spool 14, followed by the appropriate separation and re-joining of their ends at the 3-dB couplers, so as to provide the clockwise and counter-clockwise paths shown in FIG. 1. This winding procedure helps to ensure that external environmental effects (temperature, vibration) are common to both paths, and do not cause unwanted relative phase shifts. To further minimize unwanted phase shifts, the optical path lengths from P1 to P3 and from P2 to P4 are closely matched. The toroidal electrical winding 23 encircling the coils is distributed around the circumference of the spool to achieve a circular field following the same closed circular path as the fibers making up the coils.

In the preferred embodiment, the terminals 24 and 25 to the winding are connected to a reversible source of constant current, schematically illustrated as being comprised of a single pole double throw switch 26 connected to a fixed current source 27. The switch is in practice a fast acting semiconductor device capable of handling the required current and the reversals at the desired rate. Operation of the switch 26 causes the current in the coil 23 to reverse in direction. The lines of magnetic flux form closed circular paths and proceed in a clockwise or counter-clockwise sense as a function of current direction. The lines of flux are thus either parallel to or anti-parallel to the optical fibers. Thus the magnetic field is in the same or opposite direction to the direction of light propagation in the fibers. Assuming that the core of the fiber is of a material having a sufficiently high sensitivity to the magnetic field, i.e. a sufficiently high Verdet constant, the conditions are appropriate to achieving the required $\pi$ change in relative phase required for the switching application when the current is reversed.

If an independent phase offset is not provided in one of the fiber paths, the required phase offset and switching may be provided entirely by a constant bias current plus a switched component of current which provide the required relative phases at 19 and 20. This method will, on average, cause more electrical power dissipation in the solenoid than will switching between two equal and opposite polarity currents, with an independent phase offset control.

The operation of the Faraday effect phase rotator may be explained as follows.

If a magnetic field is directed along the propagation direction of light in the fiber, a linearly polarized optical mode will have its polarization rotated by an angle given by $\Theta = V B L_f$, where V is the Verdet coefficient, B the magnetic flux density, and $L_f$ the length of fiber. If the linear polarization is expressed in terms of right and left circular polarizations, the rotation of linear rotation is equivalent to a phase shift between the circular polarizations delta $\phi_c =$ delta $\beta_c \cdot L_f = 2\Theta$. The phase shift between right circular polarizations (for example) traveling in two separate fibers, with oppositely directed magnetic fields, is also delta $\phi_c = 2 V B L_f$. The opposing field directions can be simply obtained by winding a pair of fibers (e.g. f4, f5) inside a toroidal solenoid, and propagating the light in opposite directions in each fiber as illustrated in the figures.

If the phase shift between the two beams at the beginning of the 3-dB output coupler 13 is $\pi/2$, the light will exit in one of the fibers (f6). After reversing the current and the magnetic field, the phase shift becomes $-\pi/2$, and light will exit in the other fiber (f7). Therefore, the switching requirement is that delta $\phi_c = \pm \pi/2$. The total fiber length is $L_f = 2\pi R N_f$, where R is the torus mean radius and $N_f$ is the number of fiber turns. The flux density is $$B = \mu_o N_w i / 2\pi R, \quad (1)$$

where $\mu_o$ is the free space permeability, $N_w$ is the number of wire turns winding 23 and 'i' is the dc current through the solenoid around the fiber from source 27. The switching requirement is then $$\frac{\pi}{2} = 2 \mu_o V N_w N_f i \text{ (rad)}. \quad (2)$$

The estimated Verdet coefficient for silica fibers, scaled to 1300 nm wavelength, is $0.51° \text{ cm}^{-1} \text{ T}^{-1}$ (1 Tesla = 1 Wb/m² = 10⁴ Gauss) Numerically, the switching requirement then becomes $$i N_w N_f = 7.02 \times 10^5 \text{ Amp-turns}. \quad (3)$$

To minimize electrical dissipation and inductance, the maximum number of fiber turns should be used, consistent with optical loss constraints. Suppose we allow a total of 1.6 dB optical absorption loss for 8 switches, or 0.2 dB per switch. At 1300 nm the estimated absorption loss is 0.2 dB/km, thereby allowing $10^3$ m of fiber to be used. This limiting constraint from optical absorption loss becomes $$2\pi R N_f = 10^3 \text{ m} \quad (4)$$

In terms of the geometry of the fiber spool, the cross-section of the solenoid winding 23 should be completely filled by the fiber winding. In other words, the wire winding should be as tight as possible to minimize dissipation and inductance. With two coils of fiber assumed to be wound in hexagonal-close-packed layers, the condition for filling the torus cross-section is $N_f a_f = \pi h t/4/3$, where $a_f$ is the fiber cross-section area. Assuming a fiber diameter of 125 $\mu$m, the filled packing condition is (all linear dimensions in meters)

$$N_f = 3.67 \times 10^7 \, h \, t. \quad (5)$$

The length of the wire winding is $L_w = 2 N_w (h+t)$. Its resistance is $R_w = L_w r_w$, where $r_w$ is the resistance per unit length of the wire ($\Omega$/m). The inductance of the coil is approximately $$L = \frac{\mu_o}{2\pi} N_w^2 \frac{ht}{R}. \quad (6)$$

Assume the switching speed is limited by the standard time-constant factor $\tau = L/R_w$. If tau is given in micro-seconds ($\tau_m$), the resulting switching-time is $$\frac{N_w}{R \, r_w} \frac{h \, t}{h + t} = 10 \, \tau_m. \quad (7)$$

Finally, the amount of dc electrical power dissipation is given by $P = i^2 R_w$. In terms of the above coil parameters, this is $$2 \, i^2 N_w (h+t) \, r_w = P. \quad (8)$$

The equation indicates that use of bidirectional current switching ($\pm i$) instead of 0-2i, gives half the power dissipation [i.e. $i^2$ compared to $(\frac{1}{2})(2i)^2$], assuming a time average of 50% for each switch state. Moreover, the power dissipation is constant, except in brief switching intervals, maintaining better thermal stability in the fiber coils.

When the above constraints are manipulated, one finds an invariant relation (for the given set of fiber parameters), $P \cdot \tau_m = 16.9$ Watt-$\mu$ sec. This product is inversely proportional to the square of the Verdet coefficient, which is very weak in undoped silica, and proportional to the fiber length. If paramagnetic dopants are added to the fiber, such that the Verdet coefficient is increased more rapidly than the optical absorption coefficient, the power-speed product may be reduced.

Figure 3B:
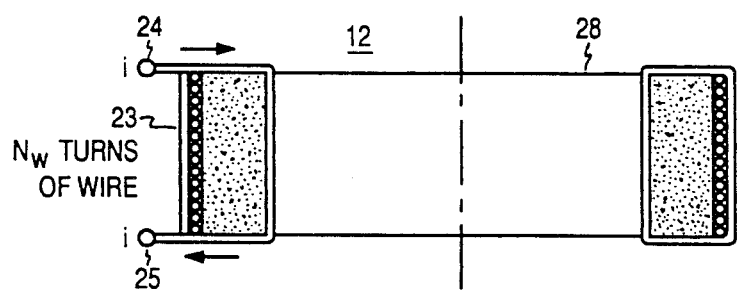

A substantial range of switch parameters may be used. One practical example illustrated in FIGS. 3 and 4, uses a spool radius R $-0.05$ m, a ratio t/h = 0.1, and a tradeoff in dissipation and switching speed, P = 4.22 Watt and $\tau_m = 4\mu s$. The previous constraints then determine $N_f = 3180$ turns, t = 2.9 mm, and h = 2.9 cm. Selecting #30 gauge wire for the solenoid ($r_w = 0.379$ $\Omega$/m) then gives $N_w = 283$ turns and i = 0.78 Amp.

An essential feature to maintaining circular polarization, required by the switching function, is the imposition of twist to fibers f3 and f4 as they are wound on spool 14. The circular birefringence induced by twisting is designed to dominate undesired linear birefringence effects arising from bending, stretching, or imperfections in the fiber.

This linear birefringence may be inherent, from manufacturing non-circularity. It also must arise from bending the fiber around the spool. This latter bend-induced birefringence is proportional to the square of the ratio of fiber to spool radii. In the above example, it is calculated to be 1 rad/m. This problem can be solved most conveniently by twisting the fibers during winding, to deliberately induce a large, permanent (but reciprocal) circular birefringence. The Faraday circular birefringence then acts as a modulation to the twist birefringence. The calculated twist birefringence is delta $\beta_c / 2 = 0.073$ T, where T is the twist rate in rad/m.

The calculations are as follows.

The linear bend birefringence is $$\beta_b = 0.5 \, C_s \, r^2 / R^2 \quad (9)$$

where
r = fiber radius—$62.5 \times 10^{-6}$ m (typical)
R = spool radius—0.05 m (design example)
$C_s = -1.32 \times 10^6$ m$^{-1}$ for silica fiber at 1.3 μm wavelength. In this case, $$\beta_b = -1.03 \text{ m}^{-1} \tag{10}$$

The twist-induced circular birefringence is $$\beta_c = g T \tag{11}$$

where
g = 0.146 for silica fibers
T = twist rate in radians/m = 94.2 (example), giving
$\beta_c = 13.8$ m$^{-1}$ in this example.
To preserve circular polarization, we require $\beta_c >> \beta_b$.

The underlying design issues required to suppress undesired linear birefringence in a coil by twisting a fiber are discussed in a paper entitled "Magneto-optic Current Sensing With Birefringent Fibers" by S. C. Rashleigh and R. Ulrich, appearing in Appl. Phys. Letter 34(11), June 1, 1979, pages 768–770.

As earlier suggested, the optical phase controller, 11, provides an independent means of controlling a constant, or slowly adjustable, phase offset between paths f5 and f4. This allows for operation of the Faraday phase shifter with bipolar switching currents ±i. The phase difference (modulo 2π) is adjusted over the range 0-2π by changing the optical path length, nL (where n—fiber refractive index = 1.46, L = fiber length through phase adjuster) over a free-space wavelength, (e.g. 1.3 μm). For a 1—m length, less than one part in $10^6$ change in n or L is required. This may be imparted to the fiber by installing the 1—m fiber in a thermally controlled environment and changing the temperature by a few degrees. Alternatively a few volts may be applied to a piezo-electric expansion element to which the fiber is attached to cause a comparable change in length.

The type of optical source that provides the light is determined by the fiber transmission properties and the matching of the interferometric path lengths. Optimum transmission of the most highly developed silica fibers is in the 1.3–1.5 μm wavelength range. Shorter wavelengths (e.g. 0.85 μm) could be used, but with greater absorption loss.

The optical source coherence length should be much greater than the coarse (>> lambda) difference in path lengths. For example, a line width of 100 MHZ gives a coherence length of 3 m. This length difference is less stringent than the tolerance imposed by reduction of environmental phase imbalance (delta L << 1 m).

A practical, preferred source is a single-mode, 1.3 μm semiconductor laser, whose linearly polarized output is converted to circular polarization.

What is claimed is:

1. A fiber optic switch for circularly polarized light comprising
  A) a first 3-dB fiber optic coupler comprising a pair of single mode optical fibers f1 and f2 for external connection to a source of circularly polarized light waves, between which an equal division of circularly polarized light waves occurs with a phase delay of the light wave in fiber f2 relative to that in fiber f1 of negative π/2 radians in passage through said coupler;
  B) a Faraday effect phase rotator comprising
    (1) a pair of single mode optical fibers f5 and f4 of a magneto-optically sensitive material, wound respectively in a clockwise and counter-clockwise sense to form two coaxial coils, circularly polarized light waves from said fibers f1 and f2 being supplied respectively to said fibers f5 and f4; and
    (2) a toroidal electrical winding encircling said coils for generating a circular magnetic field in a codirectional or contra-directional sense with respect to the propagation of light waves in said fibers,
  said phase rotator, when circularly polarized light waves are coupled to said fibers f5 and f4 and said winding is energized at a first current setting producing a phase delay of the light wave in fiber f5 relative to that in fiber f4 of +π/2 radians in passage through said rotator, and when said winding is energized at a second current setting producing a phase delay of the light wave in fiber f5 relative to that in fiber f4 of −π/2 radians in passage through said rotator;
  C) a second 3-dB fiber optic coupler, comprising a pair of single mode optical fibers f7 and f6, circularly polarized light waves from said fibers f5 and f4 being supplied respectively to said fibers f7 and f6,
  said second coupler, when circularly polarized light waves of equal intensity and of quadrature relative phase are coupled to said fibers f7 and f6, producing circularly polarized light waves in one fiber and none in the other fiber in passage through said coupler, or vice versa, dependent upon whether the relative quadrature phase is positive or negative, the switched output being derived from said fibers f7 and f6; and
  D) input electrical terminals for connection of said winding to a current source for supplying current at two settings, the change from one current setting to the other causing a change in the switching state of said fiber optic switch.

2. The fiber optic switch set forth in claim 1, wherein said first and second 3-dB fiber optic couplers are of the evanescent wave design for insensitivity to polarization of said light waves.

3. The fiber optic switch set forth in claim 1, wherein a fiber optic phase controller is inserted between one fiber of one of said 3-dB couplers and one fiber of said Faraday effect phase rotator to equalize the phase lengths between optical paths through said rotator.

4. The fiber optic switch set forth in claim 3, wherein said fiber optic phase controller is adjusted such that said two current settings are equal and opposite in polarity to minimize current dissipation and drift.

5. The fiber optic switch set forth in claim 1, wherein fibers f5 and f4 are twisted to induce a circular birefringence in each fiber substantially greater than the birefringence resulting from bending the fibers.

6. A fiber optic switch for circularly polarized light comprising
  A) a first 3-dB fiber optic coupler for producing an equal division of circularly polarized light waves in a pair of single mode optical fibers f1 and f2 in passage through said coupler;
  B) a Faraday effect phase rotator comprising (1) a pair of single mode optical fibers f5 and f4 of a magneto-optically sensitive material, wound respectively in a clockwise and counter-clockwise sense to form two coaxial coils, circularly polarized light waves from said fibers f1 and f2 being supplied respectively to said fibers f5 and f4; and (2) a toroidal electrical winding encircling said coils for generating a circular magnetic field in a codirectional or contra-directional sense with respect to the propagation of light waves in said fibers, said phase rotator, when circularly polarized light waves are coupled to said fibers f5 and f4 and said winding is energized at a first current setting producing a first phase delay of the light wave in fiber f5 relative to that in fiber f4 in passage through said rotator, and when said winding is energized at a second current setting producing a second phase delay of the light wave in fiber f5 relative to that in fiber f4 in passage through said rotator;

C) a second 3-dB fiber optic coupler for interferometrically combining light waves comprising a pair of single mode optical fibers f7 and f6, to which circularly polarized light waves are supplied from said fibers f5 and f4, said second coupler, when circularly polarized light waves of equal intensity and of quadrature relative phase are coupled to said fibers f7 and f6, producing circularly polarized light waves in one fiber and none in the other fiber in passage through said coupler, or vice versa, dependent upon whether the relative quadrature phase is positive or negative, the switched output being derived from said fibers f7 and f6; and D) input electrical terminals for connection of said winding to a current source for supplying current at two settings, the change from one current setting to the other causing a change in the switching state of said fiber optic switch.

* * * * *